United States Patent
Kong et al.

(10) Patent No.: US 10,713,237 B2
(45) Date of Patent: *Jul. 14, 2020

(54) AUTOMATICALLY CORRECTING INVALID SCRIPTS IN WEB APPLICATIONS

(71) Applicant: INTERNATIONAL BUSINESS MACHINES CORPORATION, Armonk, NY (US)

(72) Inventors: Yi Kong, Beijing (CN); Zi Yan Tu, Beijing (CN); Xi Ning Wang, Beijing (CN); Zhen Yu Xing, Beijing (CN); Qi Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/623,544

(22) Filed: Jun. 15, 2017

(65) Prior Publication Data

US 2017/0351730 A1   Dec. 7, 2017

Related U.S. Application Data

(63) Continuation of application No. 14/518,350, filed on Oct. 20, 2014, now Pat. No. 9,727,599.

(30) Foreign Application Priority Data

Oct. 30, 2013   (CN) .......................... 2013 1 0532298

(51) Int. Cl.
*G06F 16/00*   (2019.01)
*G06F 16/23*   (2019.01)
(Continued)

(52) U.S. Cl.
CPC ...... *G06F 16/2365* (2019.01); *G06F 16/2282* (2019.01); *G06F 16/951* (2019.01)

(58) Field of Classification Search
CPC . G06F 16/2365; G06F 16/951; G06F 16/2282
See application file for complete search history.

(56) References Cited

U.S. PATENT DOCUMENTS 7,283,993 B2 * 10/2007 McArdle ............... G06F 16/242
7,680,767 B2   3/2010 Adya et al.
(Continued)

FOREIGN PATENT DOCUMENTS

| CN | 102156672 A | 8/2011 |
| CN | 102937934 A | 2/2013 |
| WO | 2004107162 A1 | 12/2004 |

OTHER PUBLICATIONS

Kong, Yi et al., Pending Application entitled: "Automatically Correcting Invalid Scripts in Web Applications" U.S. Appl. No. 14/518,350, filed Oct. 20, 2014.
(Continued)

*Primary Examiner* — Debbie M Le
(74) *Attorney, Agent, or Firm* — Cantor Colburn LLP; Richard Wilhelm (57) ABSTRACT

According to an aspect, a method for correcting an invalid script in a web application includes determining an invalid reference in an invalid script. A storage location is determined in a database corresponding to the invalid reference based on a data relationship mapping, wherein the data relationship mapping indicates the correspondence between the reference and a storage location in the database. An up-to-date value at the storage location is queried and he queried up-to-date value is determined to be the correct value of the invalid reference.

12 Claims, 8 Drawing Sheets

(51) Int. Cl.
 *G06F 16/951* (2019.01)
 *G06F 16/22* (2019.01)

(56) References Cited

U.S. PATENT DOCUMENTS

| | | |
|---|---|---|
| 8,442,999 B2 | 5/2013 | Gorelik et al. |
| 8,448,139 B2 | 5/2013 | Ghosh |
| 8,504,985 B2 | 8/2013 | Kalaidjian |
| 8,510,716 B1 | 8/2013 | Jakubiak et al. |
| 9,064,057 B2 * | 6/2015 | Shen ................... G06F 11/3688 |
| 9,418,095 B2 | 8/2016 | Gould et al. |
| 9,483,389 B2 * | 11/2016 | Shen ................... G06F 11/3688 |
| 10,387,290 B2 * | 8/2019 | Shen ..................... G06F 11/368 |
| 2005/0075831 A1 | 4/2005 | Ilic |
| 2008/0127041 A1 | 5/2008 | Gura |
| 2012/0158801 A1 | 6/2012 | Devegowda et al. |
| 2014/0006991 A1 | 1/2014 | Kalaidjian |
| 2014/0282433 A1 | 9/2014 | Eilam et al. |
| 2015/0278080 A1 * | 10/2015 | Shen ................... G06F 11/3688 |
| | | 717/124 |

OTHER PUBLICATIONS

List of IBM Patents or Patent Applictions Treated as Related; (Appendix P), Filed Jun. 15, 2017, 2 pages.
Chinese Office Action for CN Application No. 201310532298.6 dated Dec. 30, 2016; 6 pgs.

* cited by examiner

AUTOMATICALLY CORRECTING INVALID SCRIPTS IN WEB APPLICATIONS

DOMESTIC AND FOREIGN PRIORITY

This application is a continuation of the legally related U.S. application Ser. No. 14/518,350 filed Oct. 20, 2014 which claims priority to Chinese Patent Application No. 201310532298.6 filed Oct. 30, 2013, and all the benefits accruing therefrom under 35 U.S.C. § 119, the contents of which in its entirety are herein incorporated by reference.

BACKGROUND

The present invention relates generally to the field of web applications and more specifically to automatically testing scripts and correcting invalid scripts in web applications.

With the prevalence of web applications, more efficient web application testing has become increasingly important. Web application errors are often caused by invalid scripts. In general, a need exists for efficient automated functional and performance testing for web applications. A more particular need exists for automatically testing scripts and correcting invalid scripts in web applications.

SUMMARY

Embodiments include a method, system, and computer program product for correcting an invalid script in a web application. A method includes determining an invalid reference in an invalid script. A storage location is determined in a database corresponding to the invalid reference based on a data relationship mapping, wherein the data relationship mapping indicates the correspondence between the reference and a storage location in the database. An up-to-date value at the storage location is queried and he queried up-to-date value is determined to be the correct value of the invalid reference.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to determining when a script in a web application has become invalid due to an invalid data correlation. A correct value of an invalid reference that corresponds to the invalid data correlation is determined, and the invalid script is corrected to enable the web application to run correctly. More specifically, when an script has become invalid due to an invalid data correlation, a correct value of an invalid reference corresponding to the invalid data correlation may be identified based on a data relationship mapping indicating a correspondence between the reference and a storage location in a database, thereby enabling the invalid script to run correctly to complete functional testing on the application and thus correct the invalid script.

With the prevalence of web applications, more efficient web application testing has become increasingly important. Particularly, more efficient automated web application testing has become increasingly important for functional and performance testing. The common method is to leverage existing web test automation tools, e.g., RPT (Rational Performance Tester), Silk Performer, LoadRunner, to generate automated test scripts (hereinafter, scripts for short) to test web applications. However, the scripts typically include scenarios information supported by a back-end system. While in the current development models, a web application will be updated frequently for different builds, which would cause existing scripts not valid any more. Further, based on development experience, there are about 70%-80% invalid scripts that are caused by invalid data correlation.

Consider an example in which a customer logged on to an online store to purchase products, so as to illustrate data correlation and invalid data correlation. Assume that the customer logged on to an online store to purchase products. This scenario will be described below with reference to FIG. 7. For a web application and a server, when the customer selects some items and clicks on the "Add to Cart" button, an add-to-cart request 71 is generated (shown as an URL in FIG. 7), and then is sent to the server. An order ID (orderId) is generated at the back end for this operation. The server generates a response 72 to this request (for example, a response to the add-to-cart request shown in FIG. 7), and the generated order ID is displayed in the response, for example, 10503 in this example.

When the user has selected all items required to purchase, a "check out" button is clicked to produce a checkout request 74 (shown as an URL in FIG. 7), which is then sent to the server. The server generates a response 75 to this request, in which the order ID previously generated is required. That is, the order ID in the checkout request depends on the order ID generated in the response to the add-to-cart request, to enable the customer to complete the shopping flow successfully.

Figure 7:
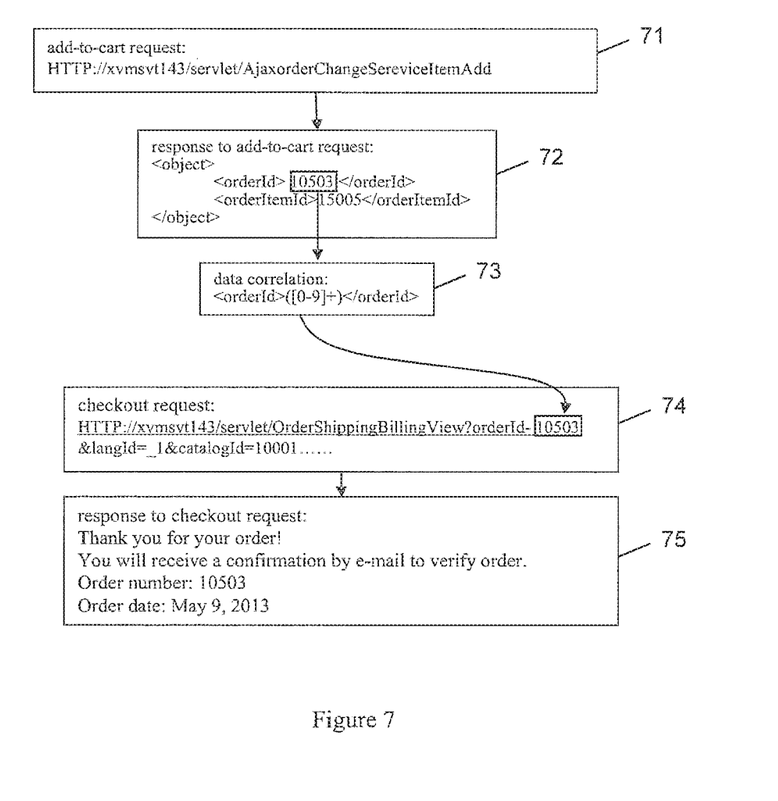
FIG. 7 is a schematic diagram of testing a web application with a script in the prior art.

When an automatic script is used to simulate the above operations, at first, the add-to-cart request and its response are captured by a test tool. Then, the test tool creates a dynamically varying variable that will be used in a later checkout request as a reference, in this example, for example, the order ID. A regular expression is generated for the reference, so that the value of the reference (order ID in this example) may be forwarded to a later checkout request as a key parameter. With the generated regular expression, specific part to be acquired may be filtered from a response to the add-to-cart request, in this example, for example, the order ID. Then, when a response to a later checkout request is generated, a value of a referenced order ID may be obtained using this regular expression, for example 10503, to generate a correct response to the checkout request. Here, the complete process of creating a reference for a variable (for example, the order ID in this example) that corresponds to a value required in a later request and its response, and then correlating the reference to a parameter in the later request is referred to as data correlation. In this description, data correlation is represented by a regular expression for convenience.

Figure 8:
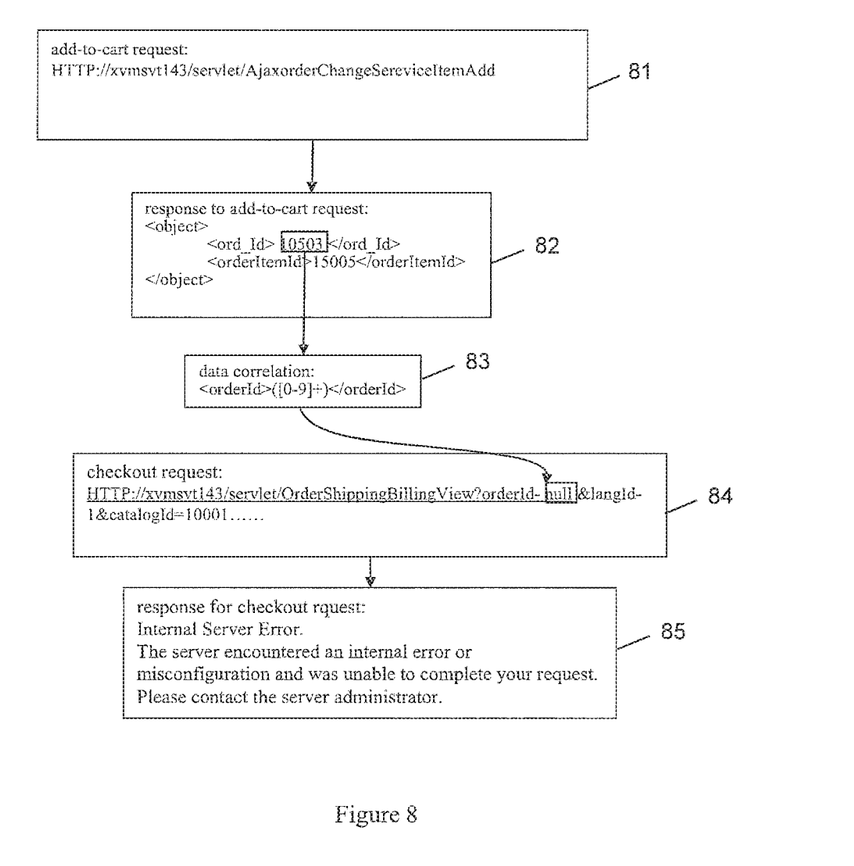
FIG. 8 is a schematic diagram of causing an invalid script by changes in a web application in the prior art.

However, in the field of web applications, the following situation may commonly arise. For example, a developer of a web application may modify an element name in source code. For example, the developer may change an element name "orderId" to "ord_Id". This situation will be described with reference to FIG. 8 below, which begins with the add-to-cart request 81. When a test tool tests the web application using a previously recorded script, the data correlation in the previously recorded script becomes invalid, because the referenced name has changed from "orderId" to "ord_Id" as shown in block 82 in this example. Thus, it is impossible to obtain a correct value of the reference (order ID) using a previously generated regular expression <orderId>([0-9]+)</orderId>, as shown in block 83. That is, using the data correlation in a previously recorded script, only a null value may be obtained for the reference (order ID making it impossible to get a correct value by a checkout request 84, which needs the value to produce a response, thereby the server cannot produce a correct checkout response for the checkout request and instead produces an error response 85. In this situation, a script has become due to invalid data correlation, making the test tool unable to use a script that is previously recorded and now is invalid to test the web application.

When a script has become as described above, existing test tools, e.g., RPT, Silk Performer, LoadRunner, generally need to re-record a script to resolve resulted changes. Particularly, existing solutions need to re-record a script and rewrite invalid part of the script to complete the whole test script and the scenario successfully on an updated framework. The challenge is that script maintenance engineers with experienced script PD (positioning and diagnosing) skill should understand the invalid scenario, identify issues of the script, then re-record and rewrite the script, which is also time consuming.

Thus, a method for effectively correcting an invalid script is desired to overcome the above defects in the prior art. According to one embodiment of this disclosure, a method for correcting an invalid script includes determining an invalid reference in an invalid script; determining a storage location in a database corresponding to the invalid reference based on a data relationship mapping, wherein the data relationship mapping indicates the correspondence between the reference and a storage location in the database; querying an up-to-date value at the storage location; and determining the queried up-to-date value to be the correct value of the invalid reference.

According to another embodiment, an apparatus for correcting an invalid script includes: an invalid reference determining unit configured to determine an invalid reference in an invalid script. A storage location determining unit is configured to determine a storage location in a database corresponding to the invalid reference based on a data relationship mapping, in which the data relationship mapping indicates the correspondence between the reference and a storage location in the database. A correct value querying unit is configured to query an up-to-date value at the storage location, and a correct value determining unit is configured to determine the queried up-to-date value to be the correct value of the invalid reference.

Some illustrative embodiments are described below with reference to the appended drawings, in which the certain embodiments of the present disclosure have been illustrated. However, the present disclosure can be implemented in various manners, and thus should not be construed to be limited to the specific embodiments disclosed herein. On the contrary, those embodiments are provided for the thorough and complete understanding of the present disclosure, and completely conveying the scope of the present disclosure to those skilled in the art.

Figure 1:
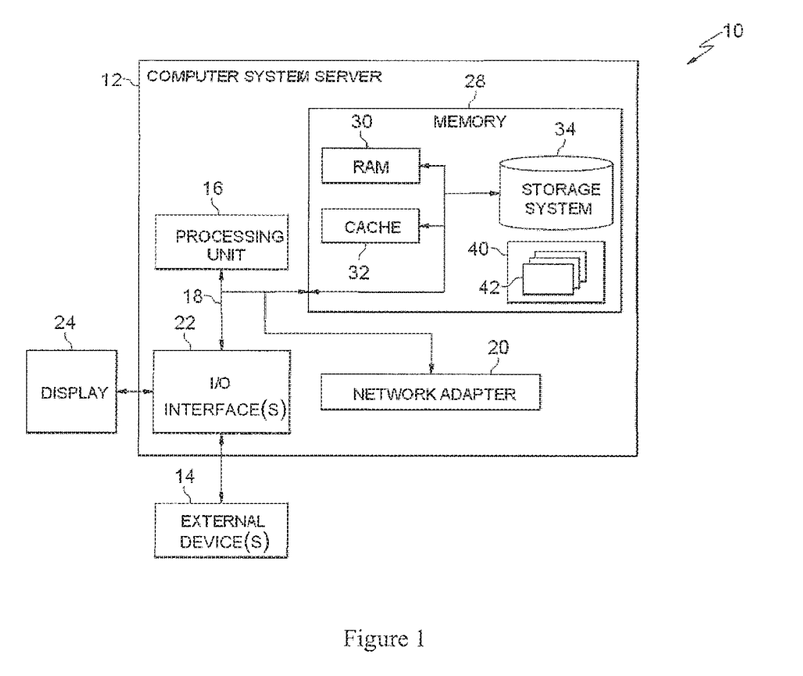
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As described above with reference to FIG. 8, a script may become invalid when modifications to a web application cause invalid data correlation. In this situation, it is beneficial if a correct value of an invalid reference corresponding to the invalid data correlation may be identified from a database, thereby run the script correctly, and correcting the script with the correct value. The method of this embodiment is intended to obtain a correct value of an invalid reference corresponding to an invalid data correlation through accessing a database, and then to correct the invalid data correlation and thus the invalid script, without the need of correcting the invalid script through re-recording and rewriting invalid part of the script.

Those skilled in the art may appreciate that the value of a reference in a script (for example, a dynamically varying variable that is required in a later request as described previously) will be stored in a storage location in a database. That is, there is a correspondence between the reference and a storage location in the database. Thus, if we can make use of a data relationship mapping which indicates such a correspondence, the value of the reference may be obtained. Embodiments of this invention attempt to access a database by using such a data relationship mapping, and to obtain the correct value of an invalid reference and thus to correct an invalid script.

Figure 2:
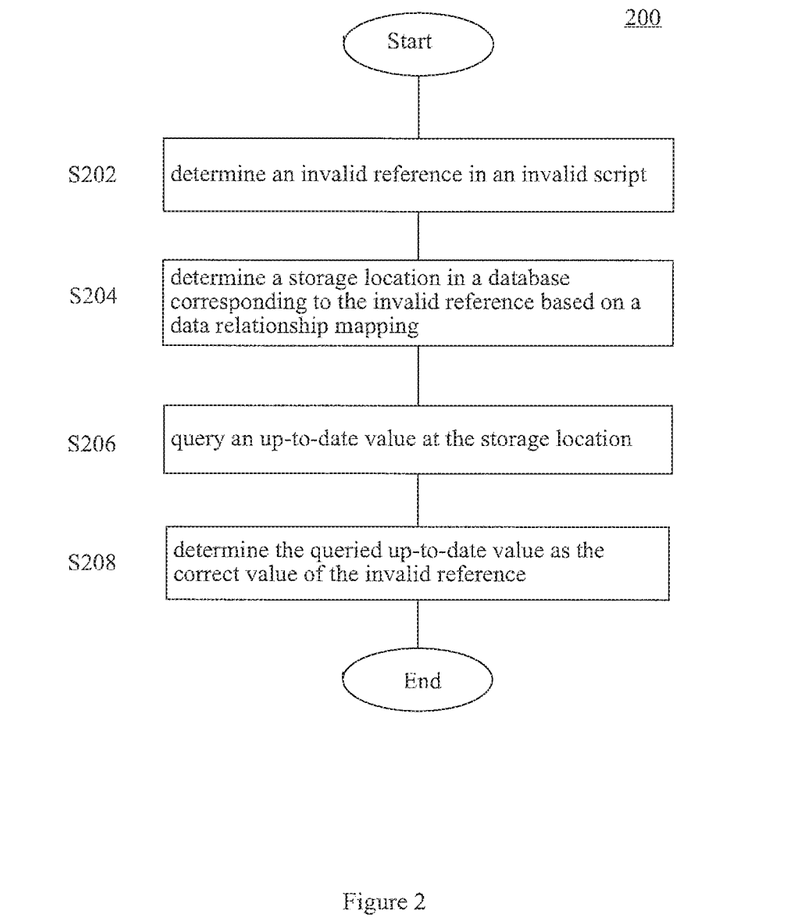
FIG. 2 is a flowchart of a method for correcting an invalid script according to an embodiment of this invention.
Figure 3:
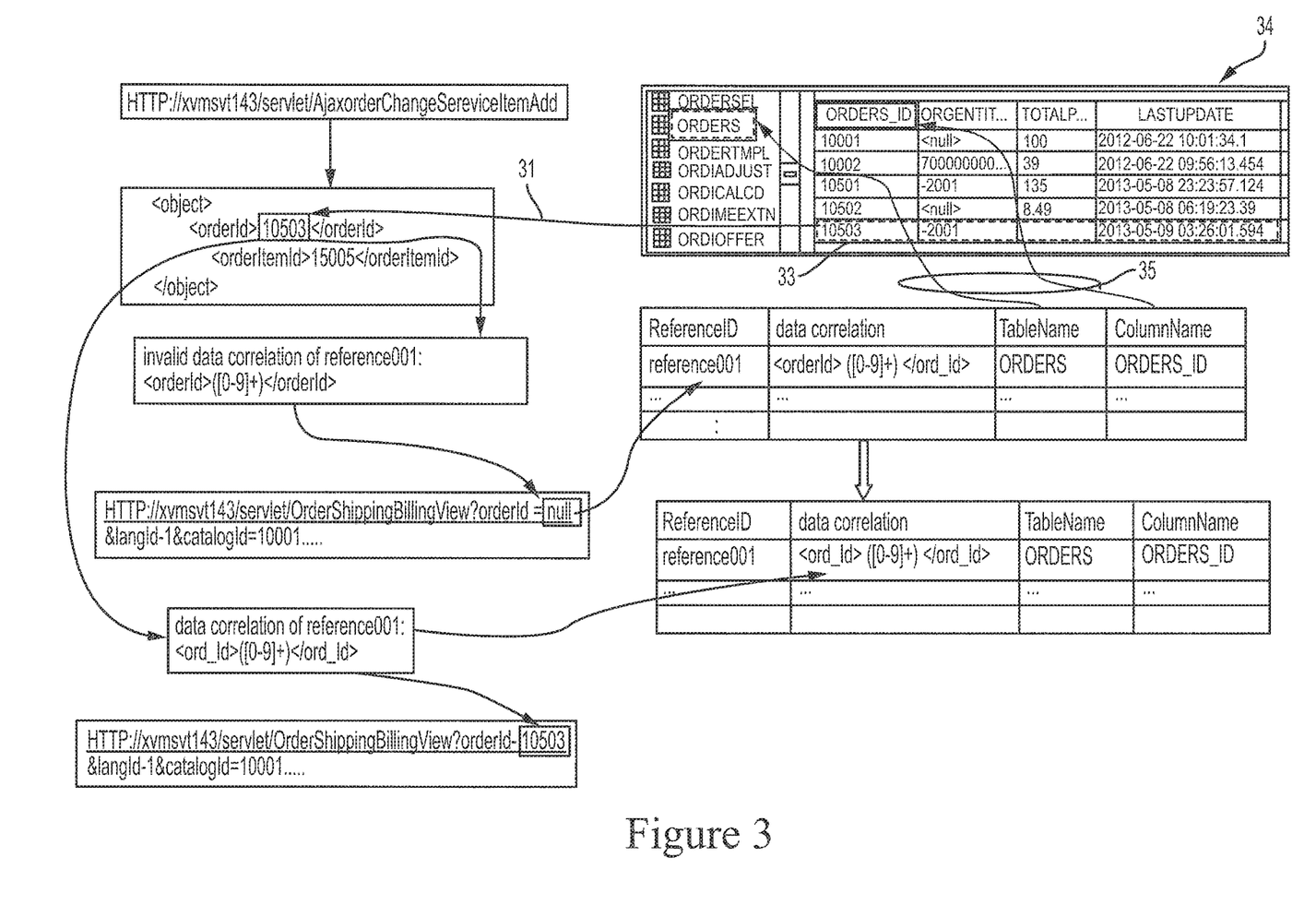
FIG. 3 is a schematic diagram of an particular example for correcting an invalid script according to an embodiment of this invention.

Embodiments will be described below with reference to FIGS. 2 to 6. FIG. 2 is a flowchart of a method 200 for correcting an invalid script according to an embodiment, and FIG. 3 is a schematic diagram of a particular example of correcting an invalid script according to an embodiment. Below, the method 200 will be described in detail with reference to FIGS. 2 and 3.

At first, an invalid reference in an invalid script is determined (block S202). For example, when a web application is tested with a script, a data correlation 31 corresponding to a reference 32 may be invalid and thereby a null value is returned, indicating that this reference has become invalid. This reference (for example, identified by a reference ID reference001 in FIG. 3) is determined as an invalid reference.

Next, a storage location 33 in a database 34 corresponding to the invalid reference 32 is determined based on a data relationship mapping 35, wherein the data relationship mapping indicates a correspondence between the reference and a storage location 33 in the database 34 (block S204).

Particularly, in the example of FIG. 3, based on a data relationship mapping which indicates a correspondence 31 between the reference 32 and a storage location 33 in the database (for example, in the form of a table as shown in FIG. 3), it is determined that the reference corresponds to a storage location 33 in the database 34 (the ORDERS_ID column in the ORDERS table in the example shown in FIG. 3). Note that the data relationship mapping 31 may be determined in advance and stored for the use in this block.

In the example of this description, for convenience, an illustration is given by taking a relational database as an example, wherein data is stored in the relational database in the form of tables. In this example, a storage location in the database is a column in a table of the database. However, embodiments are also applicable to other types of database, for example, layered databases and network databases, for which a corresponding storage location is, for example, a node. Besides, although a data relationship mapping is shown in the form of a table in FIG. 3, those skilled in the art may appreciate that the data relationship mapping may be in many other suitable forms as well, for example, in the form of a file, so long as it may indicate a correspondence between a reference and a storage location in a database.

In the example shown in FIG. 3, the data relationship mapping indicating a correspondence comprises four columns, for example, Reference ID, data correlation, Table Name, and Column Name. However, those skilled in the art may appreciate that the data relationship mapping may comprise more or less columns. For example, instead of being comprised in the data relationship mapping, the column indicating data correlation may be stored in other location. For example, for a database of other type, columns for table names and column names are unnecessary; instead, they will be replaced with location information recorded for that type of database.

Next, the method 200 proceeds to block S206, at which an up-to-date value at the storage location determined at block S204 is queried.

For example, in the example shown in FIG. 3, an up-to-date value, for example, the up-to-date value ORDERS_ID column in the ORDERS table determined at block S204 is queried, for example, 10503.

At last, the method 200 proceeds to block S208, at which the up-to-date value queried at block S206 is determined as a correct value of the invalid reference. Because in the case of an invalid script, a script is debugged in the single thread mode (in other words, a single user's behaviors are simulate), the up-to-date value at the storage location corresponds to the correct value of the reference.

In the example shown in FIG. 3, the correct value queried at block S206 (for example, 10503) is determined as the correct value of the invalid reference (for example, order ID).

With this method, when an script has become invalid due to invalid data correlation, a correct value of an invalid reference corresponding to the invalid data correlation may be identified based on a data relationship mapping indicating a correspondence between the reference and a storage location in a database, thereby enabling the invalid script to run correctly to complete functional test on the web application (i.e., test the web application in the single user mode) and thus correcting the invalid script.

After determining the correct value of the invalid reference, the method 200 may further comprise: searching a response corresponding to the invalid reference using the determined correct value to determine the location of the correct value in the response.

In the example shown in FIG. 3, a response corresponding to the invalid reference is searched using the correct value of the order ID determined at block S208 (for example, 10503) so as to obtain the location of the correct value of reference001 in the response.

The method 200 may further comprise: creating a data correlation for the invalid reference using the determined location and its context, and updating an invalid data correlation corresponding to the invalid reference with the created data correlation.

In the example shown in FIG. 3, through searching the correct value (for example, 10503) in a response corresponding to the order ID (for example, reference001), the location of the correct value in the response's content is determined; a data correlation is created using this location and its context, for example, <ord_Id>([0-9]+)</ord_Id>; and an invalid data correlation corresponding to the invalid reference, for example, <orderId>([0-9]+)</orderId> is updated with the created data correlation.

For the sake of clarity, after determining the location of the correct value in the response, how to create a data correlation using the location and the context of the location will be particularly described below with reference to FIG. 3. In the example shown in FIG. 3, the response comprises <ord_Id>10503</ord_Id>. Based on this location and its context, a regular expression <ord_Id>([0-9]+)</ord_Id> is created for reference001 as a data correlation. This regular expression represents finding out a string of numbers from 0 to 9 in arbitrary length as the value of reference001. [0-9] represents the selection range of the numbers is from 0 to 9, "+" represents a number may appear one or multiple times. Thus, when the value of reference001 is required in a subsequent request, it may be found easily in the response's content according to the regular expression <ord_Id>([0-9]+)</ord_Id>, and then may be passed to the subsequent request as a parameter.

Although how to create a data correlation has been particularly described above with reference to FIG. 3, those skilled in the art may appreciate that, after obtaining the location of the correct value, based on the location and its context, a data correlation may be created according to various data correlation methods known in the art.

With this method, the location of the correct value of the invalid reference in a response corresponding to the invalid reference may be determined using the correct value of the invalid reference, a data correlation may be created using the determined location and its context, and the invalid data correlation may be updated with the created data correlation. After the invalid data correlation of the invalid script is updated, the script is further corrected. In later use of the corrected script, functional test (for example, test for a single user) and performance test (for example, test for multiple users concurrently) may be performed for the web application, without further access to the database.

With this method, when an script has become invalid due to an invalid reference, i.e., invalid data correlation, without rewriting the script, a correct value of the invalid reference is retrieved in a database based on a data relationship mapping indicating a correspondence between the reference and a storage location in the database, thereby enabling running the script correctly and completing functional test on the web application (i.e., test the web application in the single user mode), and realizing the purpose of correcting the script. After the correct value is obtained, a response corresponding to the invalid reference is searched using the correct value to create a data correlation, and the invalid data correlation is updated with the created data correlation. After the invalid data correlation of the invalid script is updated, the script is further corrected. When using the corrected script later, functional test (for example, test for a single user) and performance test (for example, test for multiple users concurrently) may be performed for the web application, without further access to the database.

How to correct a script using a data relationship mapping indicating a correspondence between a reference and a storage location in a database has been described above. Below, an example of how to generate a data relationship mapping will be described in a particular example.

Figure 4:
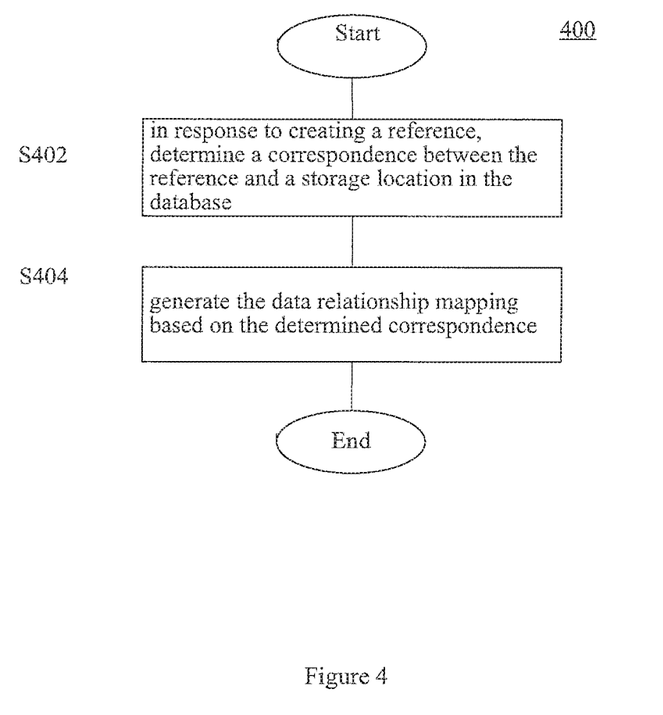
FIG. 4 is a flowchart of a method for generating a data relationship mapping according to an embodiment of this invention.
Figure 5:
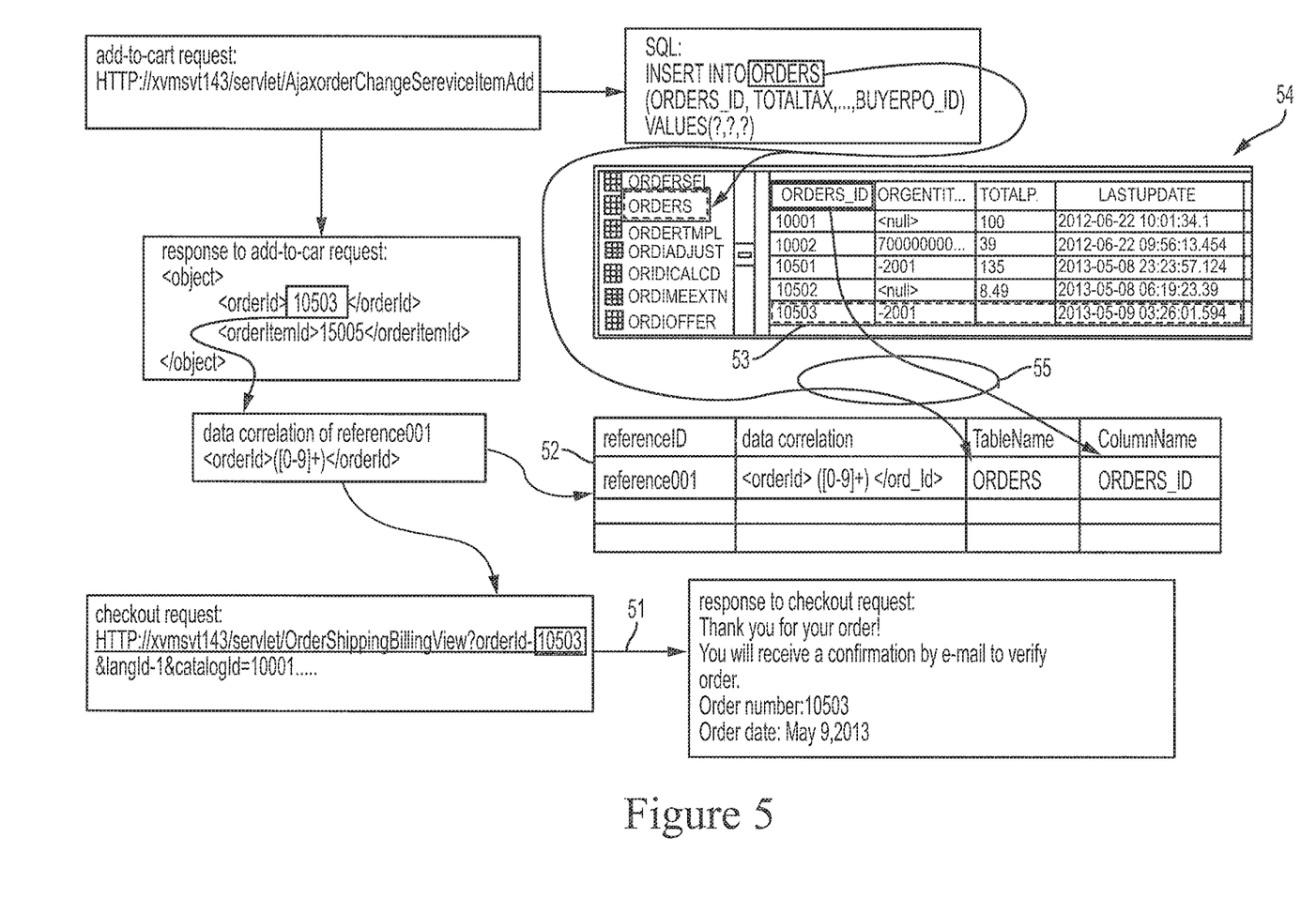
FIG. 5 is a schematic diagram of an particular example of generating a data relationship mapping according to an embodiment of this invention.

In an example, a data relationship mapping may be generated the script recording stage. FIG. 4 is a flowchart of a method 400 for generating a data relationship mapping according to an embodiment, and FIG. 5 is a schematic diagram of a particular example of generating a data relationship mapping according to the embodiment. The method 400 will be described in detail with reference to FIGS. 4 and 5 below.

First, in response to creating a reference, a correspondence 55 between the created reference 52 and a storage location 53 in a database 54 is determined (block S402).

In general, a variable in a response to a request for accessing a web application may be created as a reference, wherein creating the reference comprises creating a dynamically varying variable in the response to the request corresponding to created reference as a reference for later use. In the particular example shown in FIG. 5, the order ID (for example, orderId) in a response to the add-to-cart request (for example, represented as a URL in FIG. 5) is created as a reference 52 (for example, reference001). Note that, although a particular example of taking the order ID as a reference is described herein, those skilled in the art may appreciate that the reference may be any variables in the response to any request, which is dynamically varying and may be used in a subsequent request.

In an example, in response to creating a reference, determining a correspondence between the created reference and a storage location in a database comprises: according to database statements caused by a request corresponding to the created reference for performing operations in the database and the actual value of the created reference, determining a correspondence between the created reference and a storage location in the database, wherein the actual value of the created reference is included in a response corresponding to the created reference.

As described above, how to determine a correspondence between a reference and a storage location in a database will be described with a relational database as an example, wherein data is stored in the relational database in the form of tables. In this specific example, a storage location in the database is a column in a table of the database.

In an example, according to database statements caused by a request corresponding to the created reference for performing operations in the database and the actual value of the created reference, determining a correspondence between the created reference and a storage location in the database comprises: determining a table related with the created reference in the database according to the database statements; and traversing the determined tables using the actual value of the created reference to determine a matched column. For example, as to the add-to-cart request shown in FIG. 5, the server may produce an order ID for this request, and insert the generated order ID into a database consequently. That is, the add-to-cart request may cause an operation of inserting an order ID into a database. A particular storage location of the order ID may be found through logging a statement for performing a corresponding operation in the database, and thereby a correspondence between the reference and a storage location in the database may be established.

In an example, determining a table related with the created reference in the database according to the database statements comprises the following operations.

First of all, tables involved in the database statements are determined. The database statement depicts an operation performed on a storage location in the database, for example, a SQL statement shown in FIG. 5 indicates inserting a value in the ORDERS table. Thus, determining a table involved in the database statement may determine tables related with the created reference, i.e., in which table the value of the created reference may be stored.

Next, tables involved in all non-insert statements are filtered out from the determined tables. Because non-insert statements imply no data is inserted at a storage location in the database, tables which non-insert statements involve in do not relate with the created reference.

Next, based on attribute of the created reference, tables that do not relate with the created reference are filtered out from the remaining tables. For example, if a reference is created for the order ID, tables recording user account information, access times and other information may be unrelated with the order ID, and thus tables recording user account information, access times and other information are tables that are unrelated with the reference, which are filtered out as unrelated tables accordingly.

At last, the finally remaining table is determined as the table related with the created reference. In some situations, there may be several tables that are determined as those related with the created reference.

In another example, a table related with the reference may be determined in the following method.

For example, filtering out non-insert statements from database statements; determining a table involved in insert statements; based on attribute of the created reference, filtering out tables unrelated with the created reference from the determined tables; and determining remaining tables as those related with the reference.

After the table related with the created reference has been determined, the table is traversed by using the actual value of the created reference to determine a column matching the actual value.

In the example shown in FIG. 5, for example, using the actual value 10503 of reference001, the ORDERS table is traversed to determine that the ORDERS_ID column is the column matching reference001 in the ORDERS table.

How to determine a correspondence between a reference and a storage location in a database (for example, a column in a table in this example) has been described above with a relational database (in which data is stored in the form of tables) as an example. However, those skilled in the art know that the database is not limited to those described above, and may be any other database, so long as there is a correspondence between the reference and a storage location in the database. Other database types comprise, for example, layered databases and network databases, for which a corresponding storage location is, for example, a node.

At last, the data relationship mapping is generated based on the determined correspondence (block S404).

In the example shown in FIG. 5, based on the correspondence determined in block S402 (e.g., the ORDERS_ID column in the ORDERS table), a data relationship mapping indicating a correspondence between the reference (e.g., reference001) and a column in a table in the database is generated.

In the example shown in FIG. 5, similar to FIG. 3, the data relationship mapping indicating the correspondence is in the form of a table. However, those skilled in the art may appreciate that the data relationship mapping may be represented in any other suitable forms, for example, a file.

In the example shown in FIG. 5, similar to FIG. 3, the data relationship mapping indicating the correspondence comprises four columns, for example, Reference ID, Data Correlation, Table Name, and Column Name. However, those skilled in the art may appreciate that the data relationship mapping may comprise more or less columns. For example, instead of being included in the data relationship mapping, a column indicating data correlation may be stored at other location. Further, only one reference is shown in this data relationship mapping (for example, reference001), however, those skilled in the art may appreciate that the data relationship mapping may comprise more references as required.

With the above data relationship mapping, when a script has become invalid due to invalid data correlation, a correct value of an invalid reference corresponding to the invalid data correlation may be retrieved from a corresponding storage location in a database, and thus the invalid script may be corrected using the correct value.

A particular example of how to generate a data relationship mapping has been described with a relational database above with reference to FIG. 5. However, those skilled in the art may appreciate that the data relationship mapping may be a data relationship mapping previously stored or generated according to any other method.

In an example, the method 200 may further comprise recording a request for accessing the web application and its response, as well as database statements caused by the request, which perform operations in the database for the use of other operations of the method 200. Those skilled in the art may appreciate that the request, response and database statements performing operations in the database that are caused by the request described above may be obtained from a system log of the web application.

Particularly, in the stage of recording a test script for the web application, a user clicks various function buttons of the web application to produce a request (e.g., shown as a URL in FIG. 5), and then the request is sent to a server. As a response, the server products a response to the request. In the example of FIG. 5, the response comprises an order ID 10503. At the same time, each request triggers the server to invoke an application, which may generate corresponding database statements to operate the database when processing the request. For example, an insert statement may be generated to insert data corresponding to a variable in the request at a storage location in the database.

During the above operations, a test tool or another component of the system may record each request and its response. All information of corresponding requests and their responses is recorded in a file. Further, the test tool or another component of the system may record all database statements caused by each request during the above operations.

In the example described herein, it has been described that a test tool or another component of the system records all database statements caused by requests, and then filters out tables which non-insert statements involve in when determining a correspondence between the reference and a storage location in the database. However, those skilled in the art may appreciate that it is also possible to only record insert statements. Correspondingly, when determining a correspondence between the reference and a storage location in the database, the filtering out procedure may be omitted.

Figure 6:
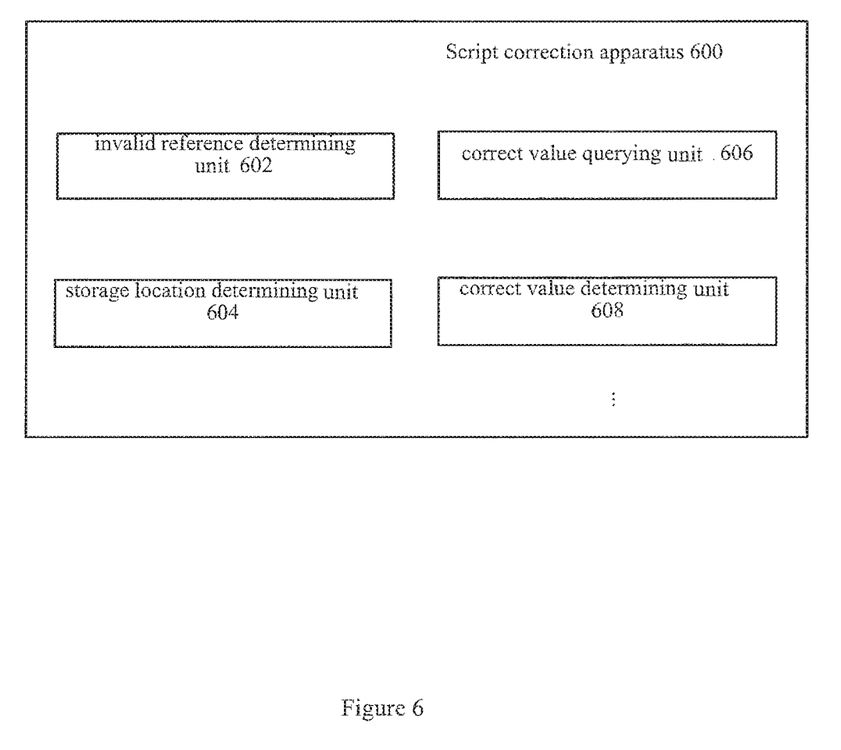
FIG. 6 is a block diagram of an apparatus for correcting an invalid script according to an embodiment of this invention.

FIG. 6 shows an apparatus 600 for correcting an invalid script according to the embodiment. The apparatus 600 comprises: an invalid reference determining unit 602, configured to determine an invalid reference in an invalid script; a storage location determining unit 604, configured to determine a storage location in a database corresponding to the invalid reference based on a data relationship mapping, wherein the data relationship mapping indicates the correspondence between the reference and a storage location in the database; a correct value querying unit 606, configured to query an up-to-date value at the storage location; and a correct value determining unit 608, configured to determine the queried up-to-date value to be the correct value of the invalid reference.

With the apparatus, when an script has become invalid due to invalid data correlation, a correct value of an invalid reference corresponding to the invalid data correlation may be identified based on a data relationship mapping indicating a correspondence between the reference and a storage location in a database, thereby enabling the invalid script to run correctly to complete functional test on the application (i.e., test the web application in a single user mode) and thus correcting the invalid script.

In an example, the apparatus 600 further comprises: a locating unit, configured to search a response corresponding to the invalid reference using the determined correct value to determine the location of the correct value in the response; a data correlation updating unit, configured to create a data correlation for the invalid reference according to the determined location and its context and update an invalid data correlation corresponding to the invalid reference with the created data correlation.

With the apparatus, the location of the correct value of the invalid reference in a response corresponding to the invalid reference may be determined using the correct value of the invalid reference, a data correlation may be created using the determined location and its context, and the invalid data correlation may be updated with the created data correlation. After the invalid data correlation of the invalid script is updated, the script is further corrected. When using the corrected script later, functional test (for example, test for a single user) and performance test (for example, test for multiple users concurrently) may be performed for the web application, without further access to the database.

With the apparatus, when a script has become invalid due to an invalid reference, i.e., invalid data correlation, without rewriting the script, a correct value of the invalid reference is retrieved in a database based on a data relationship mapping indicating a correspondence between the reference and a storage location in the database. After the correct value is obtained, a response corresponding to the invalid reference is searched using the correct value to create a data correlation, and the invalid data correlation is updated with the created data correlation. After the invalid data correlation of the invalid script is updated, the script is further corrected. When using the corrected script later, functional test (for example, test for a single user) and performance test (for example, test for multiple users concurrently) may be performed for the web application, without further access to the database.

In an example, the data relationship mapping is generated by the following unit: a correspondence determining unit, configured to, in response to creating a reference, determine a correspondence between the reference and a storage location in the database; and a data relationship mapping generating unit, configured to generate the data relationship mapping based on the determined correspondence.

In an example, the correspondence determining unit is further configured to: determine a correspondence between the created reference and a storage location in the database according to database statements caused by a request corresponding to the created reference for performing operations in the database and the actual value of the created reference, in which the actual value of the created reference is included in a response corresponding to the created reference.

In an example, the correspondence determining unit is further configured to: determine tables related with the created reference in the database according to the database statements; and traverse the table using the actual value of the created reference to determine a matched column.

In an example, determining a table related with the created reference in the database according to the database statements comprises: filtering out all tables which non-insert statements involve in from tables which the database statements involve in; based on attribute of the created reference, filtering out tables unrelated with the created reference from the remaining tables; and determining the finally remaining table as the table related with the created reference.

Note that, the method and apparatus embodiments have been described above with an example of a web application for online shopping. However, those skilled in the art may appreciate that the web application may be any other existing web application, or a web application developed in the future.

Illustrative embodiments include a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for correcting an invalid script in a web application, comprising:
   determining an invalid reference in an invalid script;

determining a storage location in a database corresponding to the invalid reference based on a data relationship mapping, in which the data relationship mapping indicates the correspondence between the reference and a storage location in the database;

querying an up-to-date value at the storage location;

determining the queried up-to-date value to be the correct value of the invalid reference;

searching a response corresponding to the invalid reference using the determined correct value to determine the location of the correct value in the response; and creating a data correlation for the invalid reference according to the determined location and its context and updating an invalid data correlation corresponding to the invalid reference with the created data correlation.

2. The method according to claim 1, wherein the data correlation is determined by:

in response to creating a reference, determining a correspondence between the created reference and a storage location in the database; and generating the data relationship mapping based on the determined correspondence.

3. The method according to claim 2, wherein determining a correspondence between the created reference and a storage location in the database comprises:

determining a correspondence between the created reference and a storage location in the database according to database statements caused by a request corresponding to the created reference for performing operations in the database and the actual value of the created reference, wherein the actual value of the created reference is included in a response corresponding to the created reference.

4. The method according to claim 3, wherein determining a correspondence between the created reference and a storage location in the database according to database statements caused by a request corresponding to the created reference for performing operations in the database and the actual value of the created reference comprises:

determining a table related with the created reference in the database according to the database statements; and traversing the table using the actual value of the created reference to determine a matched column.

5. An apparatus for correcting an invalid script in a web application comprising:

a memory having computer readable instructions; and a processor for executing the computer readable instructions, the computer readable instructions including:

determining an invalid reference in an invalid script;

determining a storage location in a database corresponding to the invalid reference based on a data relationship mapping, in which the data relationship mapping indicates the correspondence between the reference and a storage location in the database;

querying an up-to-date value at the storage location;

determining the queried up-to-date value to be the correct value of the invalid reference;

searching a response corresponding to the invalid reference using the determined correct value to determine the location of the correct value in the response; and creating a data correlation for the invalid reference according to the determined location and its context and updating an invalid data correlation corresponding to the invalid reference with the created data correlation.

6. The apparatus according to claim 5, wherein the data correlation is determined by:

in response to creating a reference, determining a correspondence between the created reference and a storage location in the database; and generating the data relationship mapping based on the determined correspondence.

7. The apparatus according to claim 6, wherein determining a correspondence between the created reference and a storage location in the database comprises:

determining a correspondence between the created reference and a storage location in the database according to database statements caused by a request corresponding to the created reference for performing operations in the database and the actual value of the created reference, wherein the actual value of the created reference is included in a response corresponding to the created reference.

8. The apparatus according to claim 7, wherein determining a correspondence between the created reference and a storage location in the database according to database statements caused by a request corresponding to the created reference for performing operations in the database and the actual value of the created reference comprises:

determining a table related with the created reference in the database according to the database statements; and traversing the table using the actual value of the created reference to determine a matched column.

9. A computer program product for correcting an invalid script in a web application, the computer program product comprising computer readable storage medium having program instructions embodied therewith, wherein the computer readable storage medium is not a transitory signal per se, the program instructions executable by a computer to cause the computer to perform a method comprising:

determining an invalid reference in an invalid script;

determining a storage location in a database corresponding to the invalid reference based on a data relationship mapping, wherein the data relationship mapping indicates the correspondence between the reference and a storage location in the database;

querying an up-to-date value at the storage location;

determining the queried up-to-date value to be the correct value of the invalid reference;

searching a response corresponding to the invalid reference using the determined correct value to determine the location of the correct value in the response;

creating a data correlation for the invalid reference according to the determined location and its context and updating an invalid data correlation corresponding to the invalid reference with the created data correlation.

10. The computer program product according to claim 9, wherein the data correlation is determined by:

in response to creating a reference, determining a correspondence between the created reference and a storage location in the database; and generating the data relationship mapping based on the determined correspondence.

11. The computer program product according to claim 9, wherein determining a correspondence between the created reference and a storage location in the database comprises:

determining a correspondence between the created reference and a storage location in the database according to database statements caused by a request corresponding to the created reference for performing operations in the database and the actual value of the created reference, wherein the actual value of the created reference is included in a response corresponding to the created reference.

12. The computer program product according to claim 11, wherein determining a correspondence between the created reference and a storage location in the database according to database statements caused by a request corresponding to the created reference for performing operations in the database and the actual value of the created reference comprises:
   determining a table related with the created reference in the database according to the database statements; and
   traversing the table using the actual value of the created reference to determine a matched column.

* * * * *